United States Patent [19]
Favalora

[11] Patent Number: 5,936,767
[45] Date of Patent: Aug. 10, 1999

[54] MULTIPLANAR AUTOSTEREOSCOPIC IMAGING SYSTEM

[75] Inventor: Gregg E. Favalora, West Orange, N.J.

[73] Assignee: Yale University, New Haven, Conn.

[21] Appl. No.: 08/819,119

[22] Filed: Mar. 17, 1997

Related U.S. Application Data

[60] Provisional application No. 60/013,553, Mar. 18, 1996.

[51] Int. Cl.[6] .......................... G02B 27/22; G02B 27/24
[52] U.S. Cl. .................................. 359/462; 353/7
[58] Field of Search .................................. 359/462, 475, 359/477, 478, 479; 345/6, 419, 420; 353/7

[56] References Cited

U.S. PATENT DOCUMENTS

| | | | |
|---|---|---|---|
| 3,097,261 | 7/1963 | Schipper et al. | 342/180 |
| 3,140,415 | 7/1964 | Ketchpel | 345/6 |
| 3,609,706 | 9/1971 | Adamson | 345/6 |
| 3,799,652 | 3/1974 | Torguet | 350/161 |
| 3,829,838 | 8/1974 | Lewis et al. | 345/419 |
| 4,078,229 | 3/1978 | Swanson et al. | 367/107 |
| 4,100,571 | 7/1978 | Dykes et al. | 358/104 |
| 4,160,973 | 7/1979 | Berlin, Jr. | 340/718 |
| 4,814,870 | 3/1989 | Crall | 358/113 |
| 4,870,485 | 9/1989 | Downing et al. | 358/90 |
| 4,871,231 | 10/1989 | Garcia, Jr. | 359/478 |
| 4,881,068 | 11/1989 | Korevaar et al. | 345/6 |
| 4,934,773 | 6/1990 | Becker | 350/6.6 |
| 4,974,943 | 12/1990 | Noguchi | 350/358 |
| 4,982,092 | 1/1991 | Jehle | 250/332 |
| 4,983,031 | 1/1991 | Solomon | 353/10 |
| 5,042,909 | 8/1991 | Garcia, Jr. et al. | 359/478 |
| 5,082,350 | 1/1992 | Garcia et al. | 359/478 |
| 5,148,310 | 9/1992 | Batchko | 359/479 |
| 5,214,419 | 5/1993 | DeMond et al. | 340/794 |
| 5,394,262 | 2/1995 | Anderson | 359/196 |
| 5,418,632 | 5/1995 | Anderson | 359/17 |
| 5,489,950 | 2/1996 | Masuda | 348/744 |
| 5,627,554 | 5/1997 | Jefferson | 345/516 |
| 5,678,910 | 10/1997 | Martin | 359/478 |
| 5,684,621 | 11/1997 | Downing | |
| 5,703,606 | 12/1997 | Blundell | 345/6 |

OTHER PUBLICATIONS

Downing et al., "A Three–Color, Solid–State, Three Dimensional Display," *Science*, 273:1185–1189, 1996.
Glanz, "Three–Dimensional Images Are Conjured in a Crystal Cube," *Science*, 273:1172, 1996.
Soltan et al., "Laser Projected 3–D Volumetric Displays," NRaD, Naval Command, Control and Ocean Surveillance Center, RDT&E Division, San Diego, CA, 1996.
Lewis, et al., "A True Three–Dimensional Display," *IEEE Transactions on Electron Devices*. vol. 18, No. 9, 723–732, Sep. 1971.
Copy of International Search Report dated May 27, 1997.

*Primary Examiner*—Jon Henry
*Attorney, Agent, or Firm*—Fish & Richardson P.C.

[57] ABSTRACT

A moving two-dimensional display surface is used to display a three-dimensional image by repeatedly scanning multiple light beams across the surface as the surface sweeps out a display volume. The intensity of the beams is matched to the motion of the display surface and the scanning of the beams to display the three-dimensional image. In one embodiment, a rotating planar translucent material for the display surface and a rotating multifaceted mirror is used to scan the beams. In another embodiment, the three-dimensional image is formed inside a transparent material at the points of intersection of a moving two-dimensional beam and multiple light beams scanning through the material. The motion of the two-dimensional beam and the scanning of the individual light beams is controlled using optical elements whose optical properties respond to control signals.

11 Claims, 7 Drawing Sheets

MULTIPLANAR AUTOSTEREOSCOPIC IMAGING SYSTEM

This application is a continuation of Provisional application Ser. No. 60/013,553 filed on Mar. 18, 1996.

BACKGROUND OF THE INVENTION

This invention relates to displays for three-dimensional (3-D) images and more particularly to a display using a moving two-dimensional (2-D) projection surface and controlled illumination source.

Use of a moving 2-D projection surface for the display of a 3-D image is well known. The illumination sources for such displays have typically been one or more electron beams deflected by controlled electromagnetic fields and impinging upon a rotating phosphor screen or one or more high power lasers deflected toward a screen by a series of controlled mirrors. A series of points or trajectories (vectors) is displayed by controlling the time-varying deflection of the source beams. As the projection surface sweeps out a 3-D volume, all points in a 3-D volume can be illuminated. Due to the persistence of human vision, if a point is repeatedly illuminated for a brief interval with a repetition period of no more than approximately $\frac{1}{20}$ second, the point appears to be illuminated without flickering.

In another technique for projecting a 3-D image, a transparent crystalline material (glass) that produces visible illumination at the point of intersection of two light beams has been used. In a process known as two-step, two-frequency upconversion, the material is excited by light beams at two different wavelengths typically in the near-infrared spectrum. The material has been doped with small quantities of an active ion which is excited by the intersecting beams producing visible light at the points of intersection. (See Lewis et al, IEEE Trans. Elec. Dev. ED-18(9), September 1971, pp. 724–732; Downing et al, Science vol. 273, pp. 1185–1189, Aug. 30, 1996). Mechanical deflection mechanisms control the point of intersection of two light beams thereby sequentially illuminating points in the projection volume to form the image.

Both these displays are complex, expensive, and are incapable of displaying images with very large numbers of illuminated points.

SUMMARY OF THE INVENTION

In general, in one aspect, the invention features a moving two-dimensional display surface used to display a three-dimensional image by repeatedly scanning multiple light beams across the surface as the surface sweeps out a display volume. The intensity of the beams is matched to the motion of the display surface and the scanning of the beams to display the three-dimensional image.

One embodiment of the invention features a rotating planar translucent material for the display surface. A rotating multifaceted mirror is used to scan the beams. In another embodiment, the three-dimensional image is formed inside a transparent material at the points of intersection of a moving two-dimensional beam and multiple light beams scanning through the material. The motion of the two-dimensional beam and the scanning of the individual light beams is controlled using optical elements whose optical properties respond to control signals.

In general, in another aspect, the invention is an apparatus for displaying a three-dimensional image. The apparatus includes a display target including a moving two-dimensional surface sweeping out a three-dimensional display volume, where the surface is visibly illuminated by a plurality of incident light beams; a plurality of light sources which when driven produce a plurality of source light beams; scanning optics which redirect the plurality of source light beams to produce the plurality of incident light beams such that the plurality of incident light beams repeatedly scan through the three-dimensional display volume; and an illumination controller which modulates the intensity of each of the light sources in accordance with the three-dimensional image, motion of the display target, and scanning of the plurality of incident light beams.

In general, in still another aspect, the invention is a method of displaying a three-dimensional image which includes the steps of moving a two-dimensional surface through a three-dimensional display volume; illuminating a plurality of source light beams; deflecting each of the plurality of source light beams producing a plurality of incident light beams so as to repeatedly scan the plurality of incident light beams through the three-dimensional display volume; and modulating the intensity of the plurality of source light beams in accordance the three-dimensional image, motion of the two-dimensional surface and scanning of the plurality of incident light beams.

The invention allows the three-dimensional image to be seen by one or more viewers from all angles using no special goggles. In addition, the invention allows images with large numbers of points to be displayed without requiring a complex and expensive display apparatus.

DESCRIPTION OF THE PREFERRED EMBODIMENTS

This invention is a new mechanical, optical, and electronic method and apparatus for displaying (projecting) a three-dimensional image. The image, which may change over time, is projected onto a moving surface using one of a variety of methods. The idea which is constant throughout the embodiments is that slices of a three-dimensional scene are projected in whole or in parts onto a moving surface which blurs them into an image by the viewer's (or viewers') persistence of vision. The image appears to be built out of tiny glowing building blocks or voxels (volumetric pixels) which can be placed anywhere within the image volume provided they line up with the coordinate system imposed by the device architecture. The system does not require special goggles and/or head tracking equipment to look three-dimensional. An image retains its three-dimensionality even to those with just one functioning eye, since head movement discloses the spatial nature of the image. The system generates a sequence of lighting patterns which create the image.

A first mechanical and optical embodiment uses a rotating projection surface made of a translucent material. The scene is projected by repeatedly scanning beams, produced by an array of individually controllable (addressable) light sources, across the projection surface as it rotates through the display volume. The beams are scanned across the projection surface by reflecting fixed beams off a rotating polygonal mirror.

A second optical embodiment uses no moving parts. The display includes an oscillating projection surface (a plane) formed by the intersection of a two-dimensional beam through a transparent crystalline material (glass) through which scanning (one-dimensional) beams intersect. The material and the wavelengths of the two-dimensional beam and the scanning light beams are chosen to produce visible light at their points of intersection. The projection surface is oscillated by passing a fixed two-dimensional beam through an acousto-optical deflector which is driven by a control signal. A second acousto-optical deflector is used in place of the rotating mirror of the first embodiment to affect the scanning of the fixed beams produced by the individually controllable light sources.

Figure 1:
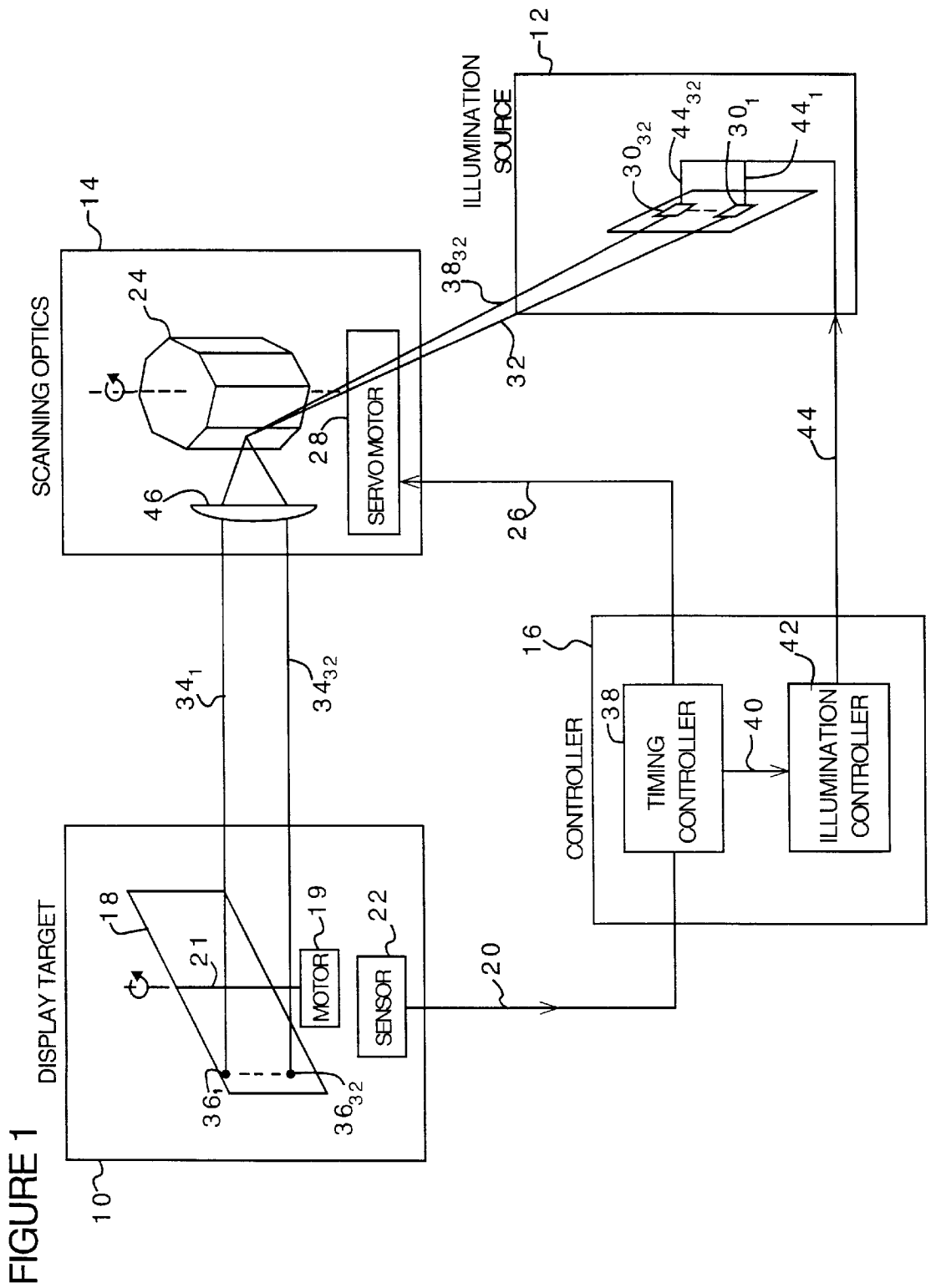
FIG. 1 shows a schematic of a mechanical and optical display apparatus.

Referring to FIG. 1, the first embodiment includes four primary components. It includes a display target 10 including a slowly rotating projection surface (screen) 18 driven by a motor 19, and an optical sensor 22 which detects each full revolution of the screen. It includes an illumination source 12 including an array of N individually controllable (addressable) light sources 30 used to illuminate the image. It includes scanning optics 14 including a rapidly rotating polygonal mirror 24 driven by a servo-controlled motor 28 which is used to scan the light beams 34 across the screen. Finally, it includes a controller 16 that synchronizes the rotation of the screen 18 and the mirror 25 and that drives the light sources 30 to form the visible image.

Rotating projection surface 18 is composed of vellum mounted on a Plexiglas sheet, approximately 100 millimeters high (along the axis of rotation) and 150 millimeters wide. The vellum is translucent and therefore an illuminated point is visible from most angles from both sides of the screen. The motor 19 has a rotating shaft 21 that is attached to the midpoint of the screen 18. On each full revolution of the motor, the optical sensor 22 produces a pulse on a master timing signal 20. This timing signal is used by the controller 16 to derive all other timing signals in the apparatus. The screen 18 sweeps out a cylindrical projection volume as it rotates. The screen is illuminated from both sides depending on the point in the rotation (i.e., there is a single projection surface, a planar screen, that has two illumination faces, the particular face being illuminated depending on the point in the rotation) therefore the volume is swept twice during each revolution of the screen.

Illumination source 12 includes N=32 individually addressable laser diodes 30 arranged in a fixed linear array. When driven, the diodes produce coplanar fixed source beams 32 of light that are directed toward and are reflected off facets of the rotating mirror 24 of the scanning optics 14. Reflected beams 34 continue toward the projection surface 18 producing visible illuminated points 36. An illumination control signal 44 includes individual binary gating signals $44_1$–$44_{32}$ that control when each of the laser diodes is driven. In this embodiment, the lasers respond to binary gating signals clocked with a period of approximately 6.5 microseconds.

Scanning optics 14 make use of a rotating S=8 sided polygonal (octagonal) mirror 24 driven by a servo-controlled motor 28. The axis of rotation of the mirror is parallel to the axis of rotation of the projection surface and the axes are separated by 300 millimeters. The mirror (Lincoln Laser Company part no. MPA DT-08-236-019/SA24C) is approximately 12.6 millimeters high, and each facet is approximately 20 millimeters wide. When the source beams 32 reflect off a single facet of the rotating mirror 24 the reflected beam 34 scans through the display volume. The mirror therefore rotates much more rapidly than the screen so that many scans are executed during each revolution of the screen. During each of these scans, the screen 18 rotates less than 3 degrees. In the description that follows, we approximate the screen as stationary during each scan and moving between scans. The rate of rotation of the mirror 24 is determined by a scanning control signal 26 generated by the controller 16. This signal drives the controller of a servo-controlled motor 28. The scanning control signal is a periodic pulsed signal with two pulses per rotation.

The scanning optics also includes a lens 46, with a focal length of 117 millimeters, to direct the light beams toward the screen. The lens is positioned approximately one focal length from the point of reflection of the light beams on the mirror surface. As the mirror rotates, this point moves a small amount relative to the focal length. We approximate it as a fixed point in the discussion that follows.

Figure 2A:
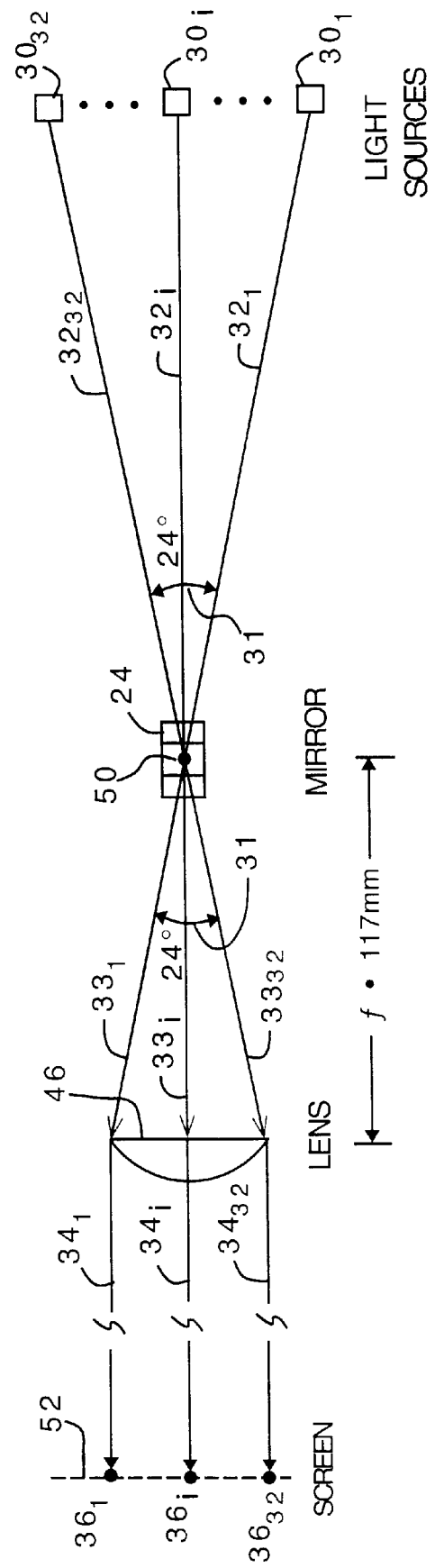
FIG. 2a and FIG. 2b show the paths of light beams from the light sources to the projection surface.

Referring to FIG. 2a, the light sources 30 produce light beams 32 that converge at the point of reflection 50 on the rotating mirror 24. The point of reflection 50 is also a focal point of the lens 46. Therefore the reflected divergent beams 33 are redirected by the lens to form parallel beams 34 which illuminate the screen at points 36. The light beams 32 and 33 each span an angle 31 of 24 degrees which ensures that the beams will pass through the lens 46.

Figure 2B:
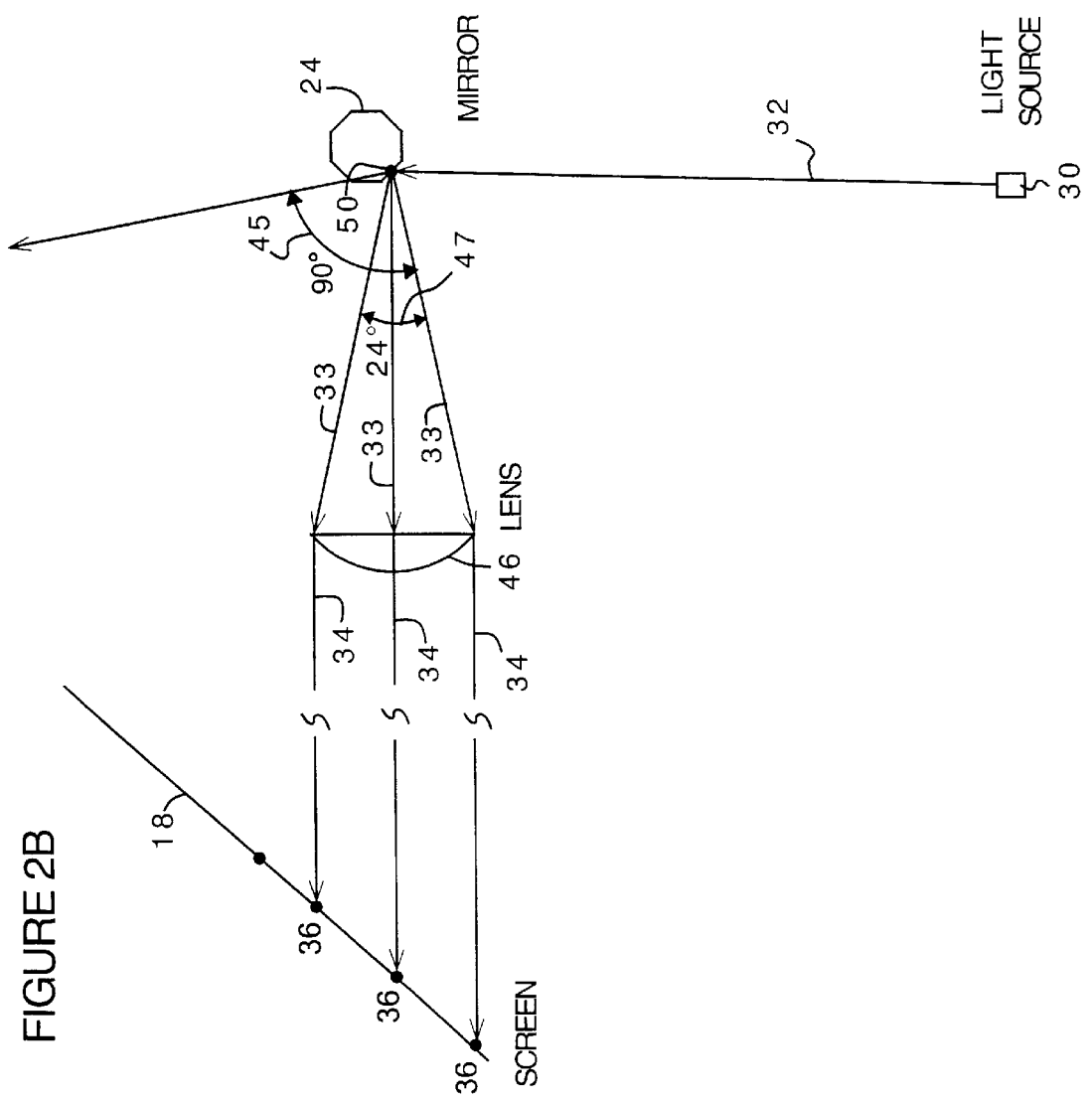

Referring to FIG. 2b, if a light source 30 were continuously illuminated, the maximum scan angle 45 that would be swept out by the reflected beam 33 would be 90 degrees for the octagonal mirror and 720/S for a general regular S-sided polygon. The light sources are enabled only in a restricted sector with a restricted scan angle 47 of 24 degrees which ensures that the beams pass through the lens 46.

Referring again to FIG. 1, controller 16 includes timing controller 38 that uses the timing signal 20 to produce the scanning control signal 26 and an illumination timing signal 40. The illumination timing signal 40 is used by an illumination controller 42 to generate illumination control signal 44 which is used to gate the illumination of the diode light sources 32.

Figure 5:
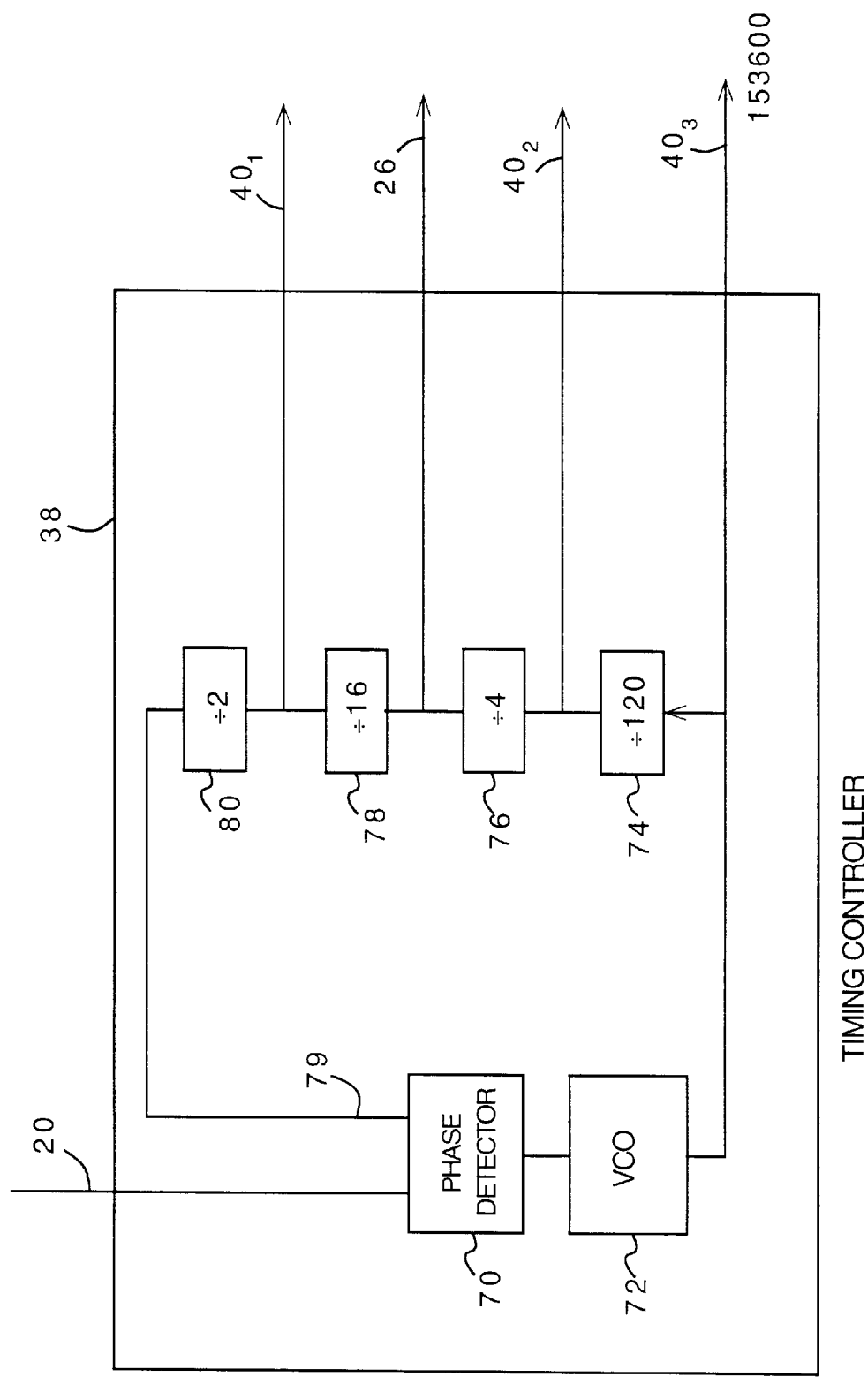
FIG. 5 shows a timing controller.

Referring to FIG. 5, timing controller 38 uses master timing signal 20 which is synchronized to the rotation of the screen to derive other higher frequency timing and control signals. Four timing signals are derived using a phase-locked loop and a divide-by-N circuit arrangement. Phase comparator 70 controls voltage controlled oscillator 72 which drives the clock dividers 74, 76, 78, and 80 to match master timing signal 20 and divided clock 79. The signals produced by the clock dividers are new volume signal $40_1$ with a pulse twice per revolution of the screen (i.e., once per display volume sweep), scanning control signal 26 pulsed twice per rotation of the mirror, new mirror signal $40_2$ pulsed once per facet passing under the source light beams, and address clock $40_3$ pulsed once per possible change in the gating signal for light sources.

Figure 6:
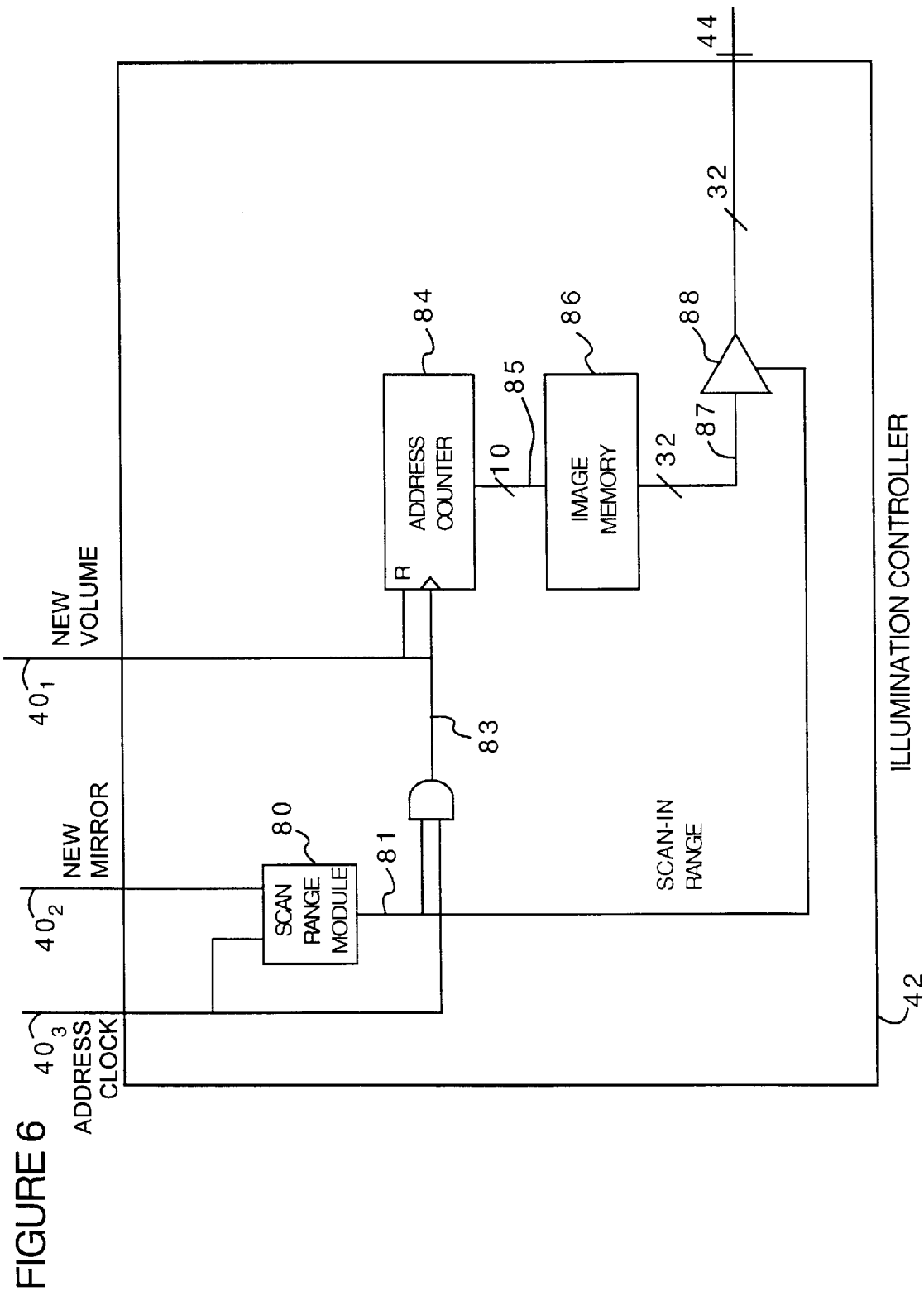
FIG. 6 shows an illumination controller.

Referring to FIG. 6, illumination controller 42 includes scan range module 80 which generates scan-in-range signal 81, which is used to enable the light sources 30 only when the scan is in the restricted scan angle 47 shown in FIG. 2b. Illumination controller 42 also includes memory address counter 84 which is incremented by clock signal 83 formed by gating address clock $40_3$ with scan-in-range signal 81 thereby incrementing the counter only while the beam is in restricted scan angle 47. The counter is reset by new volume signal $40_1$ to initiate each repetition of the image. Address counter 84 outputs address signals 85 to select the appropriate memory locations in image memory 86. Image memory 86 has N=32 parallel image data lines 87. Data lines 87 supply input to driver 88 that is enabled by the scan-in-range signal 81 to produce the illumination control signal 44 composed of the 32 binary gating signals $44_1$–$44_{32}$.

Referring again to FIG. 1, in operation, screen motor 19 rotates screen 18 at a constant rate of full rotation of F=10 seconds$^{-1}$. Both faces of the screen are used to receive light beams 34. Therefore, a new face passes a fixed point in the display volume every 1/(2×F)=1/20 of a second. The optical sensor 22 drives the master timing signal 20 with a pulse every 1/F=1/10 of a second. The timing controller 38 generates a new volume signal $40_1$ with two pulses per revolution.

Figure 3:
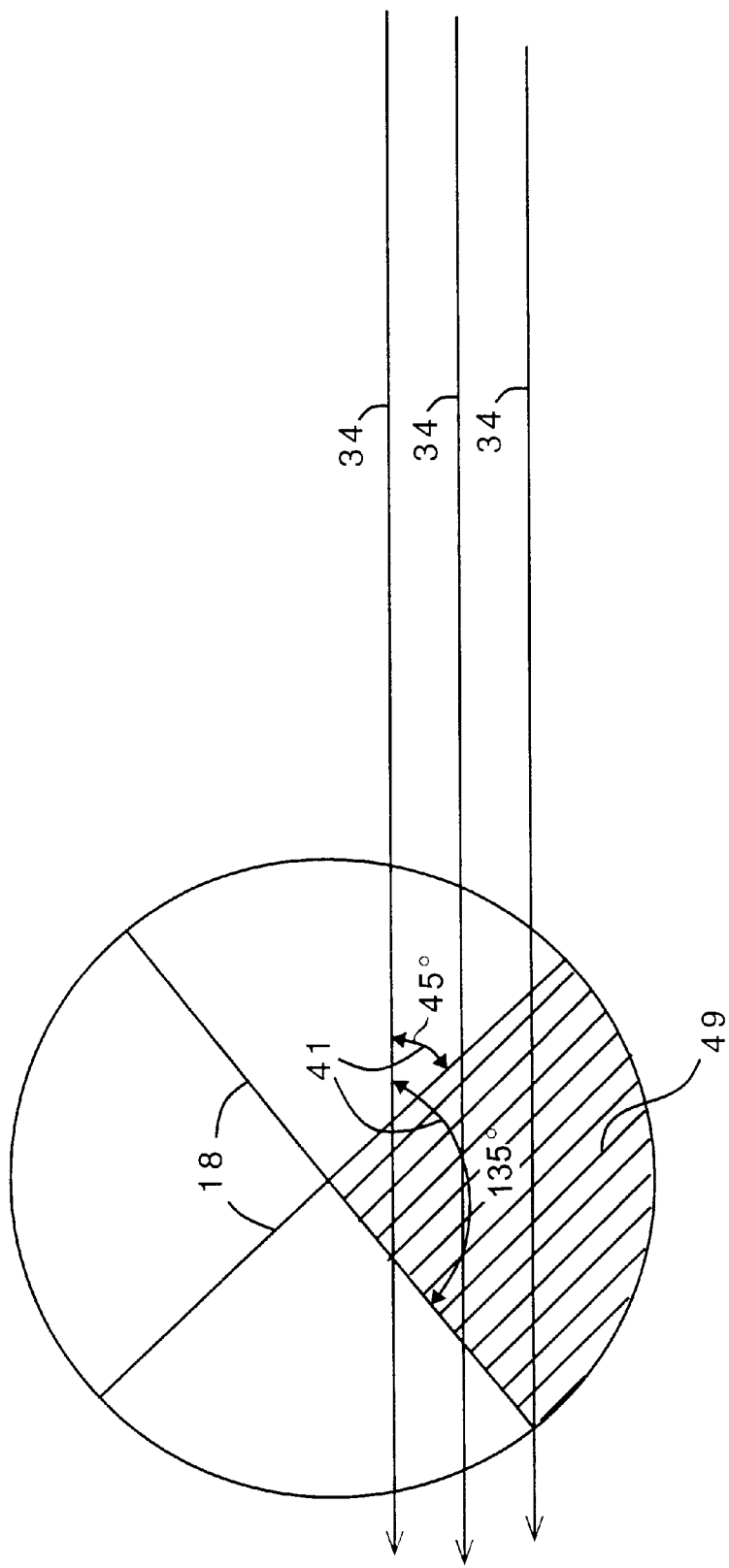
FIG. 3 illustrates the rotation of the display surface and the intersecting incident light beams.

Referring to FIG. 3, oncoming beams 34 form angle 48 with the screen. One cannot project usefully when angle 48 is too small or too large, so only a portion of the screen rotation is used. In this embodiment, angle 48 is restricted to be between 45 degrees and 135 degrees forming restricted display volume 49. This volume corresponds to a 90 degree sector that is swept through in 1/40 of a second. In general if a sector forming a fraction 1/A, where A=4 in this case, of the display volume is used, it is swept through in time 1/(F×A). The pulses of master timing signal 20 are synchronized with the screen entering the restricted display volume.

A sequence of M=32 "slices" of the display volume are used to display the image as the screen sweeps through the sector of the restricted display volume. When the restricted display volume is a 90 degree sector, these slices are separated by 90/32=2.8 degrees, or in general by 360/(A×M) degrees. A single facet of the mirror is used to scan each slice. Therefore, the rate that new facets deflect the light beams must be A×M times the rate F of full rotations of the screen. In this case A×M×F=1280 Hz. This is the rate of new mirror signal $40_2$ computed by timing controller 38.

Referring again to FIG. 2b, light sources 30 must be enabled only in restricted scanning angle 47 of 24 degrees. The ratio of maximum scanning angle 45 of 90 degrees and the restricted scanning angle 47 of 24 degrees is P=3.75. This corresponds to using a fraction 1/P of maximum scanning angle 45. During the scan through the display volume, L clocked intervals are used to display the image. Since only a fraction 1/P of maximum scan angle 45 is used, L*P clocked intervals are needed during the time of a complete scan through maximum scan angle 45. Complete scans are executed at a rate A×M×F therefore the clock rate needed to display the image is L×P×A×M×F=153600 Hz. This is the rate of the address clock signal $40_3$.

The rate of rotation of mirror 24 is determined by the rate scans are executed. If there are S facets on mirror 24, mirror 24 must rotate at 1/S the rate of the new mirror signal. This corresponds to a rate A×M×F/S=160 Hz. Since the servo-controlled motor requires twice this rate, scanning control signal 26 is pulsed at 2×A×M×F/S=320 Hz.

In order to restrict the scan to the desired 24 degrees, the light sources are blanked after the first L address clock times starting at the new mirror signal pulse. This is controlled by the blanking module 80 which generates the scan-in-range signal 81 to be set for the first L=32 periods of the address clock signal $40_3$ from the new mirror signal $40_2$. The housing of the servo-controlled motor 28 is physically adjusted (rotated) and then remains fixed so that the restricted scan angle corresponds to the particular sector to be scanned.

The stored representation of the scene is arranged such that an address counter cycles through the L×M addresses per sweep through the volume. For L=32 and M=32, this corresponds to using a 10-bit counter to cycle through the stored locations, 5 bits corresponding to the slice and 5 bits corresponding to the scan angles. The N=32 image data lines 87 are output from image memory 86 in parallel and are used to gate the corresponding light sources. Address counter 84 is cleared by new volume signal $40_1$ and clocked by gated address clock 83. Light sources 30 are enabled by the scan-in-range signal 81 for the first L=32 pulses of address clock $40_1$ after each new mirror pulse.

Figure 4:
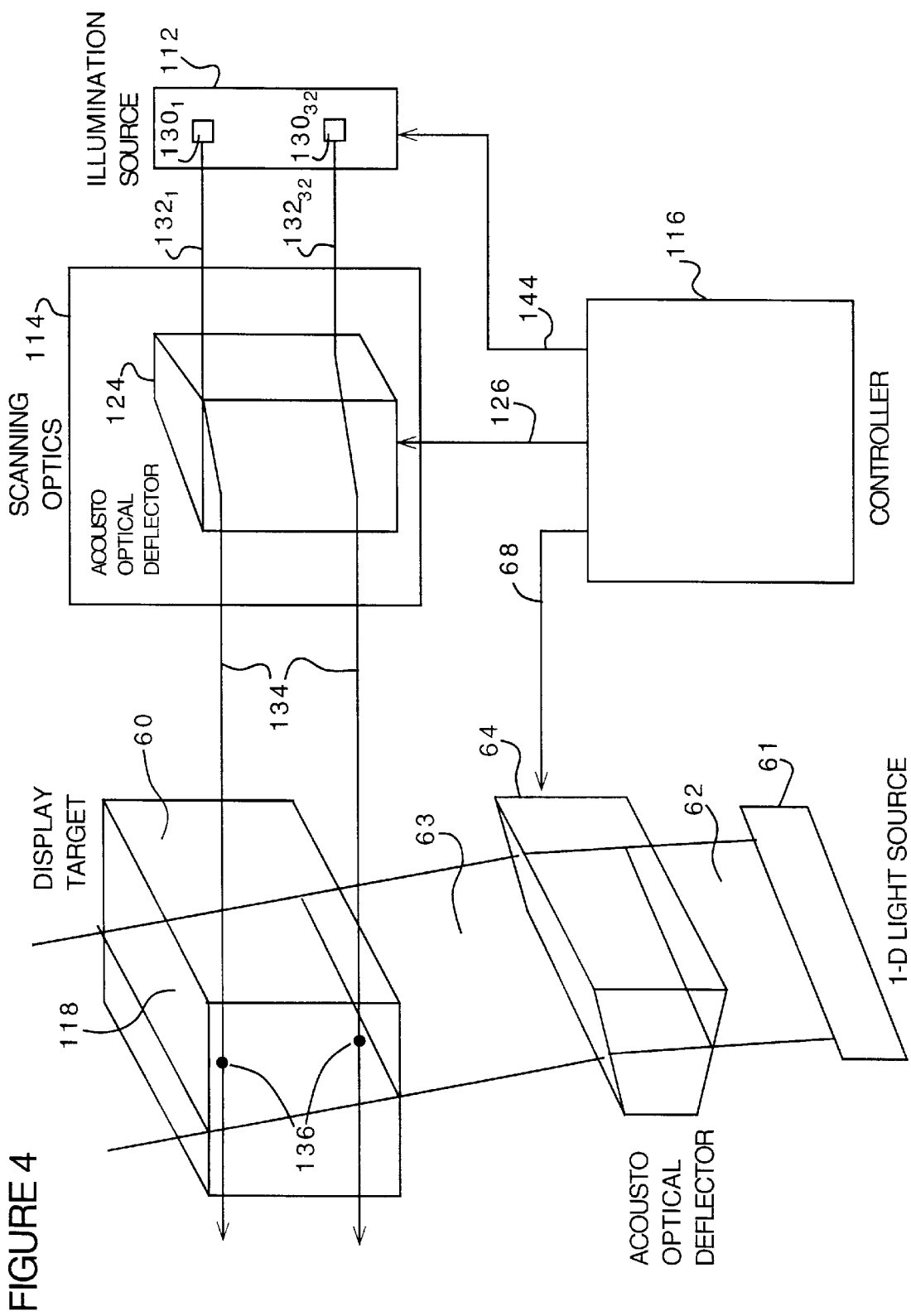
FIG. 4 shows an optical display apparatus with no moving parts.

In another embodiment shown in FIG. 4, doped, transparent crystalline material 60, specifically the heavy metal fluoride glass, ZBLNaCl, doped with 0.1% Pr$^{3+}$, a rare earth lanthanide, as described in Downing et al (1996), is used in display target 110. In a process known as two-step, two-frequency upconversion, the material is excited by light beams at two different wavelengths typically in the near-infrared spectrum. The doping material is excited by the intersecting beams producing visible light at the points of intersection. (See Lewis et al, IEEE Trans. Elec. Dev. ED-18(9), September. 1971, pp. 724–732). Also, two separate acousto-optical deflectors are used to deflect beams in the system. Such a deflector includes a volume of transparent material to which an ultrasonic transducer is coupled. In operation, the amount of absorbed ultrasonic energy affects the index of refraction of a material. This change in the index of refraction can be used to vary the deflection of a beam passing through a prism composed of the material. (See for example U.S. Pat. No. 3,799,652 and U.S. Pat. No. 4,974,943 for particular optical arrangements using acousto-optical devices.)

Fixed 2-D beam 62 is produced by 1-D light source 61. Such a 1-D light source can be made of a point laser light source projecting though a lens that spreads the beam in only a single direction. Fixed 2-D beam 62 is deflected by acousto-optical (AO) deflector 64 driven by target control signal 68 to produce moving target beam 63. This beam intersects crystalline material 60 producing projection surface 18 along which the particles of the crystalline material are partially excited. Beams 134 intersect with the projection surface as in the mechanical embodiment described previously. In this case, rather than reflecting or dispersing off a physical screen, the incident light further excites the partially excited particles to a fully excited state causing visible light to be produced. 1-D light source 61 and individually controllable light source 132 are chosen to have wavelengths to elicit this two-step excitation process in the display material. Specifically, light source 61 uses a 32 watt laser with a wavelength of 1014 nanometers and individually controlled light sources 132 each use a 0.2 watt laser with a wavelength of 840 nanometers.

Also shown in FIG. 4 are scanning optics 114 in which the rotating mirror of the mechanical embodiment is replaced by acousto-optical (AO) deflector 124 that scans an incident beam in response to scanning control signal 126.

Scanning control signal 126 and target control signal 68 are used to drive acousto-optical deflectors 64 and 124 to move beams 63 and 134 back and forth. Illumination control signal 144 gates light sources 132 in accordance with this oscillation and the image to be displayed.

The rates of oscillation of beams 63 and 134 are limited by two factors. First, when target beam 63 illuminates projection surface 118, the particles remain partially excited with a decay time constant of 180 microseconds after the beam no longer illuminates the particles. This limits the rate at which incident beam 134 can return to the same deflection without causing a "ghost" image at the previous position of projection surface 118. The second limitation is the rate with which the index of refraction of the acousto-optical elements can be changed, thereby limiting the rate with which the beams can scan. Soltan et al (Naval Command, Control and Ocean Surveillance Center report) discloses an acousto-optical material $TeO_2$ that has an "access time" of 5.0 microseconds to affect the change in the index of refraction in response to a control signal. With M=32 positions for the target beam, L=32 scan positions for the deflected beams 134, and a total time to display the image once of $\frac{1}{20}$ seconds, the time T at each scan position must satisfy (L×T+180 microseconds)×M=$\frac{1}{20}$ seconds, or T=43.5 microseconds. Scanning control signal 126 can therefore be used to deflect beams 134 in discrete steps at a rate of one every 43.5 microseconds.

In other embodiments, other illumination sources could be used. For example, the light sources can be arranged in a 2-D array and used directly without the scanning optics. Alternatively, a single light source could be scanned both horizontally and vertically. Also, the reflected beams could be offset vertically between sweeps of the display volume thereby interlacing the scans and yielding a vertical resolution which is some factor greater than the number of light sources. Finally, a small integrated array of light sources would allow smaller physical dimensions, and possibly obviate the need for optical elements such as the lens used in the embodiment disclosed.

Other embodiments could use non-planar projection surfaces such as a rotating helix, and the screen can vibrate or move through the projection volume in other ways. In addition, the scanning optics could revolve with the rotating screen as in U.S. Pat. No. 5,148,310. Also, scanning optics could use other elements such as holograms.

Other embodiments could use a different control method. The controller could be responsive to timing signals from both the display target and the scanning optics rather than controlling the deflection of the scanning optics. The motion of the display target and the scanning optics could be synchronized by some other means. They could also operate independently so long as the controller drives the light sources in accordance with their motion.

In other embodiments, multiple colors of light sources could be mixed to produce a color display, and the intensity of the light sources could be modulated to produce intermediate levels of brightness rather than the on/off control in the preferred embodiment. Intensity could be modulated by directly modulating the driving signal, using pulse-width modulation of the driving signals, or driving subsets of ganged light sources arranged to illuminate the same voxel. Additional optical elements, including active focusing elements and projection masks could be employed to affect the projected image. A variety of light sources other than laser diodes could also be used in conjunction with focussing optics.

This invention could also be combined with known dual mirror enclosures allowing the viewer to physically interact with the display volume.

The mechanical arrangement of the apparatus could easily be modified in a variety of ways, for example introducing mirrors to "fold" the beams to reduce the physical dimensions of the apparatus. Also, the mechanical projection surface could be enclosed within a surface for example to reduce air resistance.

Finally, the representation of the image could be stored in the apparatus as in the disclosed embodiments, or could be transmitted to the apparatus as it is displayed. A transmitted image could be used to display a live or moving scene. In addition, a coordinate transformation from one coordinate system, for example from a Cartesian coordinate system, to the coordinate system determined by the geometry of the apparatus could be used during the scanning process to transform or access an image stored or transmitted in that coordinate system.

What is claimed is:

1. An apparatus for displaying a three-dimensional image comprising:
   a display target having a two-dimensional surface which during operation sweeps out a three-dimensional display volume in which the two-dimensional surface is visibly illuminated by a plurality of individually modulated, parallel, spaced apart, incident light beams,
   a plurality of individually modulatable light sources which when driven produce a corresponding plurality of source light beams,
   scanning optics which during operation redirects said plurality of source light beams to produce the plurality of parallel, spaced apart incident light beams such that said plurality of incident light beams repeatedly scan through the three-dimensional display volume in a raster scan fashion,
   an illumination controller which during operation modulates the intensity of each of said plurality of light sources in accordance with the three-dimensional image, motion of the display target, and scanning of the plurality of incident light beams.

2. The apparatus of claim 1 wherein the display target comprises a translucent material forming the two-dimensional surface.

3. The apparatus of claim 1 wherein the two-dimensional surface is planar and is rotatable about a fixed axis.

4. The apparatus of claim 1 wherein the plurality of light sources is arranged in a one-dimensional array.

5. The apparatus of claim 1 wherein the scanning optics include a rotating multifaceted mirror.

6. The apparatus of claim 1 further comprising:
   a timing controller which inputs a target position signal and generates a scanning signal, wherein the target signal varies in accordance with motion of the two-dimensional surface and the scanning optics are responsive to the scanning signal.

7. The apparatus of claim 1 wherein the illumination controller further comprises:
   an illumination controller responsive to a target position signal and to a scanning signal and which generates an illumination control signal in accordance with the three-dimensional image, wherein the target position signal varies in accordance with motion of the two-dimensional surface, the scanning signal varies in accordance with scanning of the plurality of incident light beams, and the plurality of lights sources are responsive to the illumination control signal.

8. The apparatus of claim 1 wherein the display target further comprises a transparent three-dimensional material, and the moving two-dimensional surface is formed by a one-dimensional target light source forming an intersecting two-dimensional target light beam through the material, the material being such that the points of intersection between the target light beam and the incident light beam are visible.

9. The apparatus of claim 1 wherein the scanning optics include an element whose optical properties are responsive to a control signal.

10. An apparatus for displaying a three-dimensional image comprising:
- a display target including a rotatable planar surface formed by a translucent material, wherein during operation the surface is visibly illuminated by a plurality of parallel, spaced-apart incident light beams and wherein the display target produces a target position signal varying in accordance with motion of the rotatable planar surface,
- a plurality of light sources which during operation produces a plurality of individually modulated source light beams, where the plurality of light sources are arranged in a one-dimensional array,
- a rotatable multifaceted mirror, wherein during operation said mirror reflects the plurality of source light beams producing the plurality of parallel, spaced-apart incident light beams which repeatedly scan through the three-dimensional display volume in a raster scan fashion,
- a timing controller which takes the target position signal as input and generates a scanning signal which controls an angle of rotation of the rotatable mirror, and
- an illumination controller responsive to the target position signal and to the scanning signal which generates an illumination control signal in accordance with the three-dimensional image, wherein the plurality of light sources are responsive to the illumination control signal.

11. A method of displaying a three-dimensional image comprising
- mechanically moving a two-dimensional surface through a three-dimensional display volume,
- generating a plurality of individually modulated source light beams,
- producing a plurality of parallel, spaced-apart incident light beams from the plurality of source light beams,
- repeatedly scanning said plurality of parallel, spaced-apart incident light beams through the three-dimensional display volume in a raster scan fashion, and
- modulating the intensity of the plurality of source light beams in accordance the three-dimensional image, motion of the two-dimensional surface and scanning of the plurality of incident light beams.

* * * * *